United States Patent [19]

Giallanza

[11] Patent Number: 4,608,813
[45] Date of Patent: Sep. 2, 1986

[54] APPARATUS WITH AN ADJUSTABLE CONTAINER FOR PICKING FRUIT

[76] Inventor: Sam J. Giallanza, 8207 E. Coolidge, Scottsdale, Ariz. 85251

[21] Appl. No.: 703,104

[22] Filed: Feb. 19, 1985

[51] Int. Cl.⁴ .............................................. A01D 46/24
[52] U.S. Cl. .................................... 56/338; 56/332
[58] Field of Search ............... 56/332, 334, 336, 337, 56/338, 340, 333, 335, 339

[56] References Cited

U.S. PATENT DOCUMENTS

| | | | |
|---|---|---|---|
| 190,267 | 5/1877 | Bevans | 56/337 |
| 681,203 | 8/1901 | Eddy | 56/337 |
| 838,131 | 12/1906 | Murdoch | 56/332 |
| 942,302 | 12/1909 | Ableman | 56/339 |
| 2,508,805 | 5/1950 | Scott | 56/338 |
| 2,811,007 | 10/1957 | Tredway | 56/336 |
| 3,595,001 | 7/1971 | Shumaker | 56/338 |
| 4,463,545 | 8/1984 | Giallanza | 56/338 |
| 4,476,670 | 10/1984 | Ukai et al. | 56/329 |

FOREIGN PATENT DOCUMENTS 198993  8/1958  Austria ................................. 56/338

*Primary Examiner*—Robert P. Swiatek
*Assistant Examiner*—David L. Tarnoff
*Attorney, Agent, or Firm*—Harry M. Weiss & Associates

[57] ABSTRACT

An apparatus for picking fruit having an elongated pole attached to upper and lower portions that are removably coupled to each other. Each portion of the apparatus has a metal mounting sheet with a wire container attached to it. The upper mounting sheet of the upper portion has a guide channel groove used for guiding the stem of a piece of fruit to be picked to a position near a first cutting blade located at the bottom of the groove. A guide arm slidably engages two positioning guides attached to the upper mounting sheet. When a cord attached to the end of the guide arm is pulled, a second cutting blade attached near the top of the guide arm moves from an upper position to a lower position proximate the first cutting blade at the bottom of the guide channel groove. As the blades come together, they sever the stem of each piece of fruit to be picked. A spring is used to return the guide arm to its upper position. The guide arm and spring are coupled by a protective shield. The lower portion of the apparatus may be removed from its upper portion and from the elongated pole in order to reduce the overall weight of the apparatus. A wire bottom portion may then be removed from the lower portion and attached to the upper portion.

3 Claims, 4 Drawing Figures

APPARATUS WITH AN ADJUSTABLE CONTAINER FOR PICKING FRUIT

BACKGROUND OF THE INVENTION

The invention relates generally to apparatus for picking fruit and, more particularly, to an improved apparatus for removing fruit from a tree by severing each piece of fruit from its associated stem. The improved apparatus has an adjustable container with upper and lower portions. The lower portion of the container may be conveniently removed from the apparatus in order to decrease the weight of the apparatus.

Picking fruit from a tree, such as the various citrus fruits, typically involves the use of some type of picking apparatus if the fruit is not being picked by hand or machinery is not used. Unless a ladder is used, the picking apparatus must be extended to heights near the top of the tree in order to pick some of the fruit. If more than one piece of fruit is picked, then a container attached to the picking apparatus is needed for catching and holding the fruit. However, picking fruit will be difficult if the container is too heavy. One solution consists of furnishing a lightweight fruit picking apparatus having an adjustable container with upper and lower portions. The overall weight of the apparatus may be decreased by removing the lower portion of the container.

Because each piece of fruit to be picked is firmly attached to a tree by its associated stem, the picking apparatus should be able to easily cut each stem so that the fruit will drop into a container attached to the apparatus. This may be accomplished by the use of cutting blades which may be manipulated by a cord from ground level. Each fruit stem should be channeled or guided toward the cutting blades.

The inventor was issued U.S. Pat. No. 4,463,545 on Aug. 7, 1984. However, the apparatus disclosed in this patent does not feature an adjustable container, part of which can be removed to decrease the overall weight of the fruit picking apparatus.

Accordingly, there is a need for a lightweight fruit picking apparatus with an adjustable container which may be used to sever each piece of fruit from its associated stem.

SUMMARY OF THE INVENTION

It is an object of this invention to provide an improved apparatus for picking fruit.

It is another object of this invention to provide an improved fruit picking apparatus for removing fruit firmly attached to a fruit tree.

It is another object of this invention to provide an improved fruit picking apparatus which channels or guides the stem of each piece of fruit to cutting blades used to sever the fruit from the branches of a tree.

It is another object of this invention to provide an improved fruit picking apparatus having a container used to catch and hold the severed fruit.

It is another object of this invention to provide an improved fruit picking apparatus having an adjustable container, part of which can be removed in order to reduce the overall weight of the apparatus.

In accordance with one embodiment of this invention, an apparatus for picking fruit is provided comprising an elongated pole attached to upper and lower portions that are removably coupled to each other. Each portion of the apparatus has a metal mounting sheet with a wire container attached to it. The upper mounting sheet of the upper portion has a guide channel groove used for guiding the stem of a piece of fruit to be picked to a position near a first cutting blade located at the bottom of the groove. A guide arm slidably engages two positioning guides attached to the upper mounting sheet. When a cord attached to the end of the guide arm is pulled, a second cutting blade attached near the top of the guide arm moves from an upper position to a lower position proximate the first cutting blade at the bottom of the guide channel groove. As the blades come together, they sever the stem of each piece of fruit to be picked. The spring is used to return the guide arm to its upper position. The guide arm and spring are covered by a protective shield. The lower portion of the apparatus may be removed from its upper portion and from the elongated pole in order to reduce the overall weight of the apparatus. A wire bottom portion may then be removed from the lower portion and attached to the upper portion.

The foregoing and other objects, features and advantages of this invention will be apparent from the following, more particular, description of the preferred embodiment of the invention as illustrated in the accompanying drawings.

DESCRIPTION OF THE PREFERRED EMBODIMENT

Figure 1:
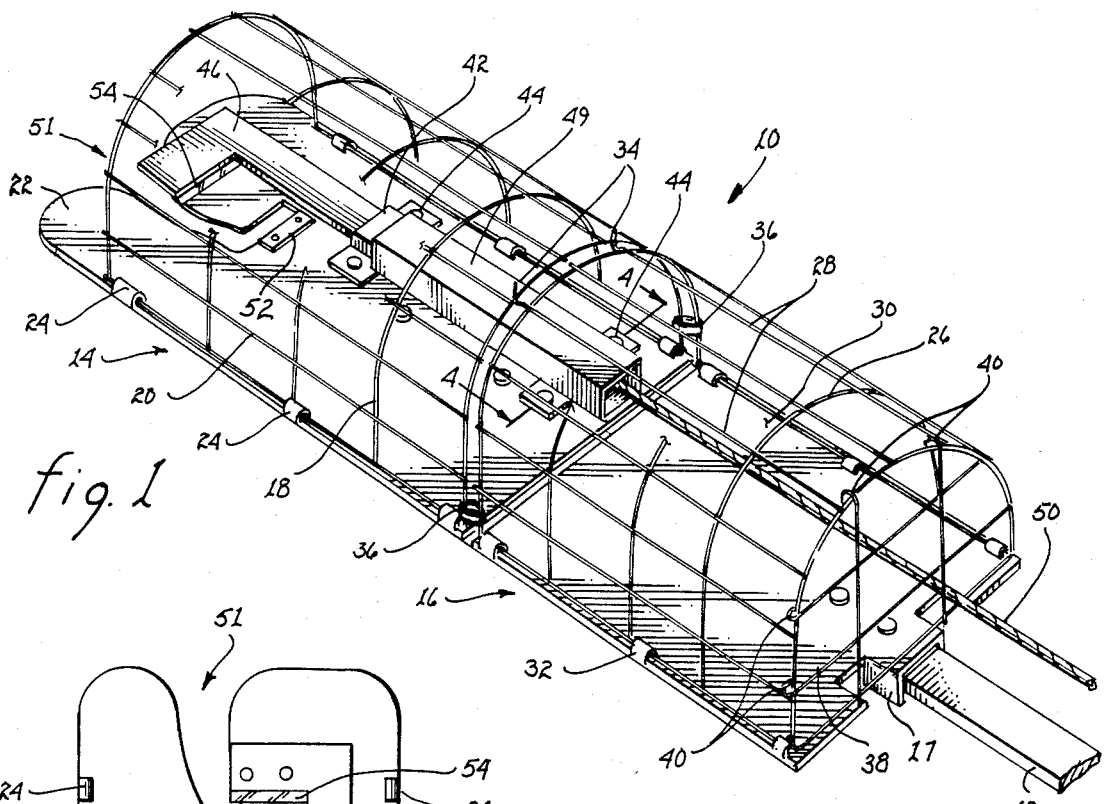
FIG. 1 is a perspective view of a fruit picking apparatus.
Figure 2:
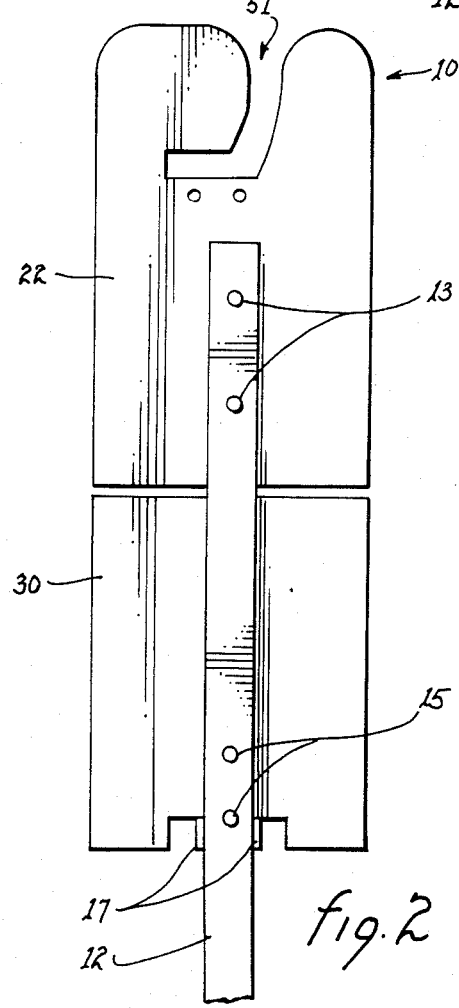
FIG. 2 is a back view of the fruit picking apparatus.

FIGS. 1 and 2 show a fruit picking apparatus, generally designated by reference member 10, attached to an elongated pole 12, the fruit picking apparatus 10 has upper and lower portions 14 and 16 preferably made out of metal. The upper portion 14 has an upper wire container comprised of horizontal and vertical wires 18 and 20 which is attached to an upper mounting sheet 22 by a plurality of fastening devices 24. The upper mounting sheet 22 is preferably attached to the elongated pole 12 by screws 13. However, bolts, nuts, or the like may be used instead of screws 13 if desired. The fastening devices 24 engage the vertical wires 20 as shown in FIG. 1. Bent tabs, clamps, clasps, hooks, or the like may be used as fastening devices 24. Similarly, lower portion 16 has a lower wire container comprised of horizontal and vertical wires 26 and 28. The lower wire container is attached to a lower mounting sheet 30 by fastening devices 32 which engage the vertical wires 28. As best shown in FIG. 2, the lower mounting sheet is coupled to the elongated pole 12 by screws 15 and guide channel 17. Note that bolts, nuts, or the like may be used instead of screws 15 if desired.

As shown in FIG. 1, the lower portion 16 may be removably attached to the upper portion 14 by hooks 34 at the ends of selected vertical wires 28 and securing devices 36. Note that any type of wire, tab, band, clasp, clamp, hook, or the like may be used instead of the hooks 34 and securing devices 36. For example, pieces of wire may be wrapped around selected horizontal wires 18 and 26 in order to attach lower portion 16 to upper portion 14. A wire bottom portion comprised of 5 horizontal wires 38 is shown removably attached to the lower portion 16 by hooks 40. Once again, any type of wire, tab, bank, clasp, clamp, hook, or the like may be used instead of hooks 40. Lower portion 16 may be removed from upper portion 14 by simply disengaging hooks 34 and securing devices 36 and removing screws 15. The wire bottom portion may then be removed from lower portion 16 and attached to the bottom of upper portion 14 by hooks 40. It is important to note that other wire configurations may be used for the upper and lower wire containers. For example, diagonal wires may be used instead of the vertical wires 20 and 28.

Figure 3:
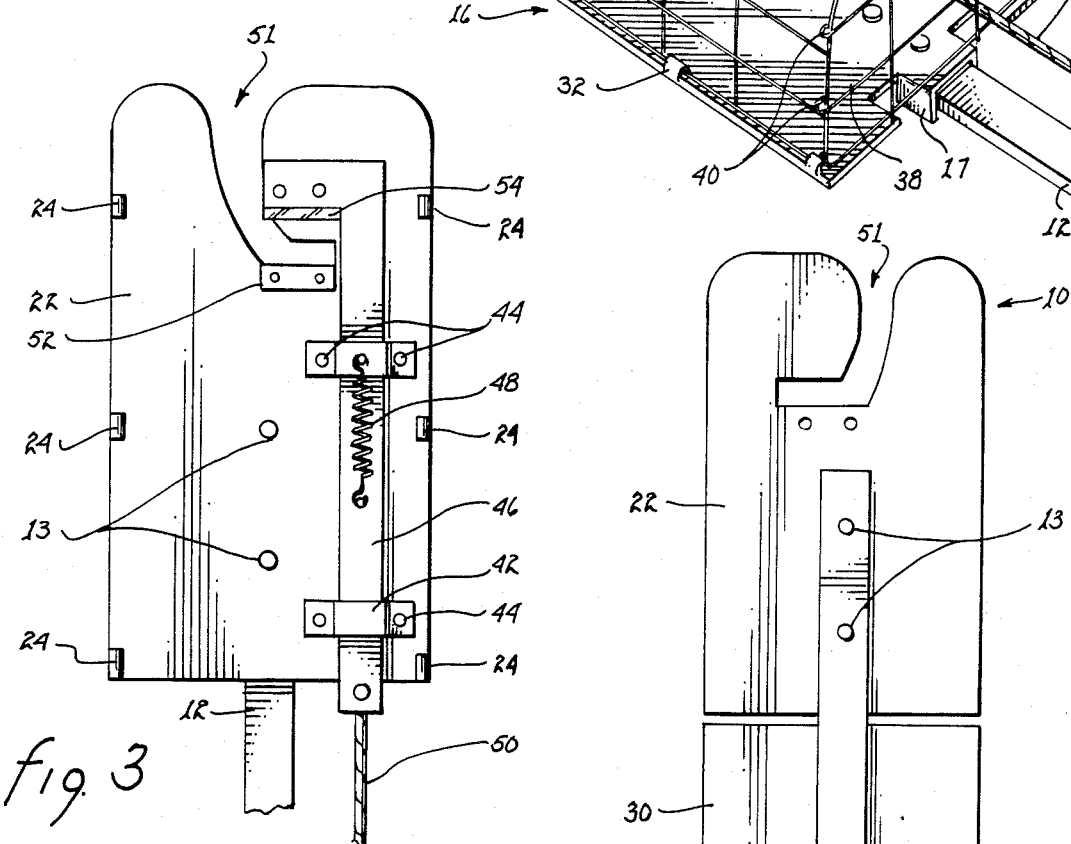
FIG. 3 is a front view of the upper portion of the fruit picking apparatus showing a guide arm in the lowered position with the upper wire container and protective shield of the apparatus removed in order to show how the guide arm slidably engages two positioning guides.
Figure 4:
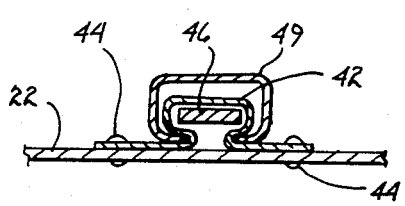
FIG. 4 is a cross-sectional view taken in the direction of the arrows 4—4 shown in FIG. 1.

As shown in FIGS. 1, 3 and 4 positioning guides 42 are attached to the upper mounting sheet 22 by rivets 44. Screws, bolts, nuts, or the like may be used instead of rivets. A guide arm 46 slidably engages the positioning guides 42. The guide arm 46 is kept in an upper position as shown in FIG. 1 by a spring 48 attached to the guide arm 46 and one of the positioning guides 42 (see FIG. 3). A cord 50 is attached to the lower end of the guide arm 46. As the cord 50 is pulled downward, the guide arm 46 moves downward to a lowered position. When the cord 50 is released, the guide arm 46 is returned to the upper position by spring 48. A protective shield 49 fits over the spring 48 and guide arm 46 as illustrated in FIGS. 1 and 4. Note that the protective shield 49 is removed (not shown) in FIG. 3 in order to shown how the guide arm 46 engages the positioning guides 42 and attaches to the spring 48. As best shown in FIG. 4, the protective shield 49 wraps around and attaches to the positioning guides 42.

The upper mounting sheet 22 has a guide channel groove 51 cut into it. A cutting blade 52 is fastened to the bottom of the groove 51. A second cutting blade 54 is fastened to the guide arm 46 as shown in FIGS. 1 and 3.

Fruit may be picked from a tree by first guiding the stem of each piece of fruit down the guide channel groove 51 until it comes into contact with cutting blade 52 and then pulling cord 50 causing the guide arm 46 and cutting blade 54 to move to the lowered position where the stem is severed. The guide arm 46 returns to the upper position due to the force exerted by spring 48 after the cord 50 is released. Each piece of severed fruit drops to the bottom of the fruit picking apparatus 10 where it is contained by the wire bottom portion. If the fruit picking apparatus 10 becomes too heavy due to the weight of the apparatus or the load of fruit contained in the upper and lower portions 14 and 16, then the lower portion 16 may be removed as explained above. This feature is particularly useful when fruit is being picked near the top of a tree.

The above description is given by way of example only. Changes in form and detail may be made by one skilled in the art without departing from the scope of the invention as defined by the appended claims.

I claim:

1. An apparatus for picking fruit, comprising:
   an elongated pole;
   an upper portion removably attached to said elongated pole including: (a) an upper mounting sheet having guide channel groove means having a first blade attached to said upper mounting sheet at the bottom of said guide channel groove means for guiding, positioning and cutting a stem of a piece of fruit to be picked, (b) guide arm means operably coupled to said upper mounting sheet for cutting said stem, said guide arm means includes: (i) a guide arm, (ii) a second blade attached to said guide arm, (iii) at least one positioning guide attached to said upper mounting sheet and (iv) cord means attached to said guide arm for moving said guide arm from an upper position to a lower cutting position so that said stem will be cut, said guide arm slidably engaging said at least one positioning guide, (c) an upper container made of wire attached to said upper mounting sheet, (d) spring means attached to said guide arm and said at least one positioning guide for returning said guide arm means to said upper position, and (e) a protective shield coupled to said at least one positioning guide; and
   a lower portion removably attached to said upper portion and said elongated pole including: (a) a lower mounting sheet, (b) a lower container made out of wire attached to said lower mounting sheet, and (c) a bottom portion removably attached to said lower container.

2. An apparatus for picking fruit, comprising:
   an elongated pole;
   an upper mounting sheet attached to said pole having a generally L-shaped channel groove and a first cutting blade located proximate the bottom of said groove;
   an upper wire container attached to said upper mounting plate;
   two positioning guides attached to said upper mounting plate;
   guide arm means slidably engaging said two positioning guides for cutting a stem, said guide arm means comprises: (a) a guide arm, (b) a second cutting blade attached to said guide arm, (c) cord means attached to said guide arm for pulling said guide arm from an upper position to a lower position to cut said stem, and (d) spring means attached to one of said two positioning guides and to said guide arm for returning said guide arm to said upper position;
   a lower mounting sheet removably attached to said pole;
   a lower wire container attached to said lower mounting sheet and removably coupled to said upper wire container;
   removable bottom means capable of being removably attached to the bottom of one of said upper and lower wire containers for supporting fruit picked by said apparatus; and
   protective shield means coupled to said two positioning guides for covering and protecting said guide arm means.

3. An apparatus for removing fruit from a tree comprising:
   an elongated handle means for handling and extending said apparatus;
   upper container means attached to said elongated handle means for severing a stem from a pice of fruit to be picked and for supporting and containing fruit, said upper container means comprises an upper mounting sheet and an upper wire container attached to said upper mounting sheet, said upper mounting sheet having a guide channel groove and a first cutting blade located at the bottom of said guide channel groove;

guide arm means operably coupled to said upper container means for severing said stem, said guide arm means comprises two positioning guides attached to said upper mounting sheet, a guide arm slidably engaging said two positioning guides, a second cutting blade attached to said guide arm, cord means attached to said guide arm for pulling said guide arm from an upper position to a lower position to cut said stem and spring means attached to one of said two positioning guides and to said guide arm for returning said guide arm to said upper position;

lower container means removably coupled to said upper container means for supporting and containing fruit, lower container means comprises a lower mounting sheet and a lower wire container attached to said lower mounting sheet;

removable bottom means capable of being removably coupled to the bottom of one of said upper and lower container means; and a protective shield coupled to said two positioning guides.

* * * * *